United States Patent
Wang et al.

(10) Patent No.: US 9,505,885 B2
(45) Date of Patent: Nov. 29, 2016

(54) METHODS OF MANUFACTURING POLY(HEXAHYDROTRIAZINE)S VIA SUSPENSION OR EMULSION POLYMERIZATION

(71) Applicants: Xiao Wang, Houston, TX (US); Anil K. Sadana, Houston, TX (US); Suman Khatiwada, Houston, TX (US)

(72) Inventors: Xiao Wang, Houston, TX (US); Anil K. Sadana, Houston, TX (US); Suman Khatiwada, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 0 days.

(21) Appl. No.: 14/674,213

(22) Filed: Mar. 31, 2015

(65) Prior Publication Data

US 2016/0289387 A1 Oct. 6, 2016

(51) Int. Cl.
*C08G 14/02* (2006.01)
*C08G 73/06* (2006.01)
*C08J 3/12* (2006.01)

(52) U.S. Cl.
CPC .......... *C08G 73/065* (2013.01); *C08G 73/0644* (2013.01); *C08J 3/12* (2013.01); *C08J 2379/04* (2013.01)

(58) Field of Classification Search
CPC .......... C08G 12/40; C08K 7/06; C08K 7/14; D01F 9/12; C03C 13/00
See application file for complete search history.

(56) References Cited

U.S. PATENT DOCUMENTS

| | | | |
|---|---|---|---|
| 7,384,434 B2 | 6/2008 | Malfer et al. | |
| 7,637,319 B2 | 12/2009 | Savery et al. | |
| 8,794,325 B2 | 8/2014 | Willberg et al. | |
| 2010/0107476 A1 | 5/2010 | Cosimbescu | |
| 2010/0200235 A1 | 8/2010 | Luo et al. | |
| 2012/0267111 A1 | 10/2012 | Khlestkin | |
| 2012/0329683 A1 | 12/2012 | Droger et al. | |
| 2014/0148560 A1 | 5/2014 | Qureshi et al. | |
| 2014/0190685 A1 | 7/2014 | Frazier et al. | |

OTHER PUBLICATIONS

Garcia et al., "Recyclable, Strong Thermosets and Organogels via Paraformaldehyde Condensation with Diamines", Science Magazine, vol. 344, May 16, 2014, pp. 732-735.
Hiller, et al., "Laser-engravable hexahydrotriazine polymer networks", Mat Res Innovat, Aug. 16, 2002, vol. 6; pp. 179-184.
Ghandi, M. et al., 'Novel Reaction of N,N'-Bisarylmethanediamines with Formaldehyde. Synthesis of Some New 1,3,5-Triaryl-1,3,5-hexahydrotriazines', Molecules a journal of synthetic chemistry and natual product chemistry, 2006, vol. 11, No. 7, pp. 556-563.
International Search Report and Written Opinion, International Application No. PCT/US2016/019545, Date of Mailing Jul. 25, 2016, Korean Intellectual Property Office; International Search Report 5 pages, Written Opinion 8 pages.
Jones, G. O. et al., 'Computational and Experimental Studies on the Mechanism of Formation of Poly (hexahydrotriazine)s and Poly(hemiaminal)s from the Reactions of Amines with Formaldehyde', Organic letters, 2014, vol. 16, No. 2, pp. 5502-5505.

*Primary Examiner* — Shane Fang

(74) *Attorney, Agent, or Firm* — Cantor Colburn LLP

(57) ABSTRACT

A method of manufacturing a hemiaminal dynamic covalent network (HDCN) comprises reacting a diamine and formaldehyde in the presence of a reaction medium comprising a polar solvent and a nonpolar solvent at a temperature of about 15° C. to about 100° C. to form the HDCN. A composition comprising the produced HDCN can be molded to form various articles comprising poly(hexahydrotriazine)s.

19 Claims, No Drawings

METHODS OF MANUFACTURING POLY(HEXAHYDROTRIAZINE)S VIA SUSPENSION OR EMULSION POLYMERIZATION

BACKGROUND

Poly(hexahydrotriazine)s are thermosetting polymers having good Young's moduli, solvent resistance, and resistance to environmental stress cracking as disclosed by Garcia et al. in Science Vol. 344, pages 732-735. However, their applications have been limited because of the challenges encountered in making the polymers as well as forming large molded parts from the polymers. The current methods of making poly(hexahydrotriazine)s involve mixing reactants in one homogeneous phase. The reaction is not readily scalable. In addition, a gel can be formed trapping solvents inside. Therefore, poly(hexahydrotriazine)s are typically made into films to facilitate solvent evaporation. Accordingly, the industry is always receptive to improved methods of making poly(hexahydrotriazine)s that is readily scalable. It would be a further advantage if poly(hexahydrotriazine)s can be readily molded to articles having various forms.

BRIEF DESCRIPTION

The above and other deficiencies in the prior art are overcome by, in an embodiment, a method of manufacturing a hemiaminal dynamic covalent network (HDCN), the method comprising reacting a diamine and formaldehyde in the presence of a reaction medium comprising a first solvent and an immiscible second solvent at a temperature of about 15° C. to about 100° C. to form the hemiaminal dynamic covalent network.

In another embodiment, a method of manufacturing a hemiaminal dynamic covalent network comprises combining a polar phase with a nonpolar phase; the polar phase comprising a diamine, formaldehyde, and a polar solvent; and the nonpolar phase comprising a nonpolar solvent to form an emulsion or suspension; and reacting the diamine with formaldehyde in the emulsion or suspension to form the hemiaminal dynamic covalent network.

A method of manufacturing an article comprising a poly (hexahydrotriazine) comprises providing a composition comprising a hemiaminal dynamic covalent network manufactured according to the methods described herein, and molding the hemiaminal dynamic covalent network to form the article comprising a poly(hexahydrotriazine).

DETAILED DESCRIPTION

The disclosure provides readily scalable methods to produce hemiaminal dynamic covalent networks. The methods use emulsion polymerization or suspension polymerization and provide HDCNs in dry powder form having controlled particle sizes. HDCNs are precursors of poly(hexahydrotriazine)s. As a further advantageous feature, the inventors have found that HDCN powders can be readily converted to poly(hexahydrotriazine)s during a molding process providing articles having various shapes and dimensions.

As used herein, a hemiaminal refers to a compound that has a hydroxyl group and an amine attached to the same carbon atom. To produce a hemiaminal, a diamine and a formaldehyde are reacted in the presence of a reaction medium comprising a first solvent and an immiscible second solvent. The reaction produces a hemiaminal dynamic covalent network (HDCN).

The first solvent is a polar solvent comprising 1-methyl-2-pyrrolidone (DMP), N,N-dimethyl formamide (DMF), N,N-dimethyl acetamide (DMAc), N-methyl-2-pyrrolidone (NMP), dimethyl sulfoxide (DMSO), hexamethylphosphoramide (HMPA), diphenyl sulfone, tetramethylene sulfone, or a combination comprising at least one of the foregoing.

The second solvent is a nonpolar solvent including aromatic hydrocarbons comprising 6 to 20 carbon atoms and aliphatic hydrocarbons. Examples of nonpolar solvent include one or more of the following: benzene; toluene; xylenes; diethyl benzene; C5-C20 alkanes; or diethyl ether. In an embodiment, the nonpolar solvent comprises an isoparaffinic hydrocarbon having less than about 5 wt. %, less than about 2 wt. %, or less than about 1 wt. % of aromatics. Isoparaffinic hydrocarbons are mixtures of hydrocarbons having carbon numbers in the range of 5-20, 7-18, 10-18, or 11-16. The isoparaffinic hydrocarbons include greater than 50 wt. %, greater than 60 wt. %, greater than 70 wt. %, or greater than 80 wt. % of isoparaffins. Branched hydrocarbons and linear hydrocarbons can also be present. Isoparaffinic hydrocarbons are commercially available, for example, as Isopar® from ExxonMobil Chemical Company.

The volume ratio of the first solvent and the second solvent is 1:1 to 1:5, 1:1 to 1:3, or 1:1 to 1:1.5.

The first solvent and the second solvent are immiscible, which means that they do not form a homogeneous mixture when added together. Thus, the polymerization can be carried out in a suspension or an emulsion.

The reaction medium can also contain water, which is either produced from the reaction of diamine and formaldehyde or carried over from the formaldehyde starting material. In an embodiment, no additional water is added to the reaction medium.

The reaction medium can comprise a surfactant, a stabilizer, or a combination comprising at least one of the foregoing. The surfactant is anionic, cationic, zwitterionic, or non-ionic. In an embodiment, the surfactant is non-ionic. Exemplary surfactant includes sorbitan esters, such as sorbitane trioleate, polyoxyethylene sorbitans, and polyoxyethylene sorbitane monooleate. Sorbitan esters are commercially available. SPAN™ 85 (sorbitane trioleate) and SPAN™ 80 (sorbitane monooleate) are specifically mentioned. The surfactant can be used alone or in combination with other surfactants known in the art. The surfactant can be present in an amount of about 0.1 to about 15 parts, about 0.5 to about 15 parts, or about 1 to about 15 parts, based on 100 total parts of the nonpolar solvent.

Any stabilizers that can lead to an improved stability of an emulsion or suspension can be used. In an embodiment, the stabilizer includes amphiphilic copolymers which have a polar unit and an apolar unit. The stabilizer can be present in an amount of about 0.01 to about 15 parts, about 0.1 to about 10 parts, or about 0.5 to about 10 parts, based on 100 total parts of the nonpolar solvent.

Exemplary diamines include 4,4'-oxydianiline, 4,4'-diaminodiphenylmethane, 3,3'-methylenedianiline, and 4-aminophenyl sulfone. As used herein, formaldehyde includes paraformaldehyde, which is the polymerization production of formaldehyde with a typical degree of polymerization of about 8 to about 100 units. The molar ratio between the diamine and the formaldehyde is about 1:5 to about 3:10, or 2:5 to about 1:2.

The monomers diamine and formaldehyde, the first and second solvents, and surfactants, and stabilizers, if present, can be mixed in any order to make a reaction mixture. In an embodiment, a first phase and a second phase are separately prepared then mixed with each other to provide a reaction mixture. The first phase is a polar phase comprising the diamine, the formaldehyde, and the polar solvent. The second phase is a nonpolar phase comprising the nonpolar solvent. The nonpolar phase can also contain a surfactant, a stabilizer, or a combination comprising at least one of the foregoing. The first phase and the second phase are made by mixing the components either at room temperature or at an elevated temperature. In an embodiment, both the first phase and the second phase are homogeneous solutions. The volume ratio of the first phase relative to the second phase is about 1:1 to about 1:5, about 1:1 to about 1:3, or about 1:1 to about 1:1.5. Once prepared, the first phase and the second phase are combined and homogenized forming a suspension or an emulsion.

The polymerization reaction is conducted at a temperature of about 15° C. to about 100° C. or about 20° C. to about 80° C. for about 10 minutes to about 10 hours or about 1 hour to about 5 hours depending on the reaction temperature and the specific diamine used. The reaction can be conducted at atmospheric pressure.

The crude product comprising HDCN and the first and second solvents can be contacted with a polar protic solvent to precipitate the HDCN. In various embodiments, the crude product can be poured, sprayed, or fed in drop-wise into a polar protic solvent. Exemplary polar protic solvent includes methanol, ethanol, isopropanol, and the like. The precipitated HDCN is then filtered and optionally dried.

The crude product can also be extracted via spray drying. The dried HDCN powders can be obtained from the emulsion by rapidly drying with a hot gas.

When the diamine is 4,4'-oxydianiline, the produced HDCN has a structure represented by the following formula:

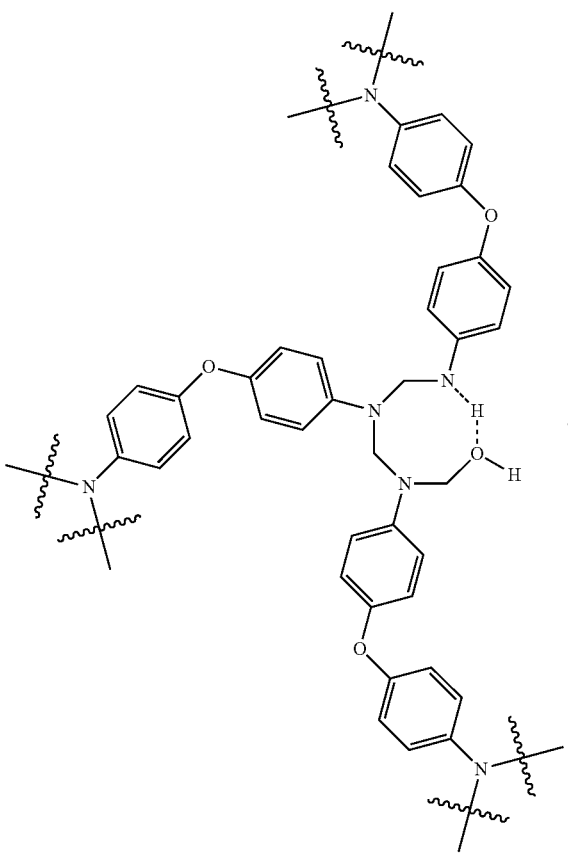

The process for making HDCNs described herein can be performed in batch mode, continuous mode or semi-continuous mode. The produced HDCNs can be used in one or more subsequent reactions to form materials such as poly(hexahydrotriazine)s.

Advantageously, the HDCNs can be molded into articles having different shapes. During the molding process, the HDCNs are converted to poly(hexahydrotriazine)s. The shapes and the types of the articles are not particularly limited and can vary depending on the particular applications. Accordingly, articles comprising poly(hexahydrotriazine)s having different shapes and dimensions can be provided.

The molding process is not particularly limited. The HDCNs are placed in a mold and heated to a temperature that is, for example, about 100° C. to about 400° C., specifically about 150° C. to about 350° C., and more specifically about 150° C. to about 300° C., and held at this temperature for about 2 hours to about 10 hours. While the HDCNs are at the elevated temperature, a compressive force is applied. The force is, for example, about 10,000 pounds per square inch (psi) to about 25,000 psi, specifically about 12,000 to about 20,000 psi, and more specifically about 15,000 psi to about 20,000 psi. The formed article is then cooled and de-molded to obtain the article comprising poly(hexahydrotriazine)s.

EXAMPLE

Paraformaldehyde (3.04 g) and 4,4'-oxydianiline (8.00 g) were added into N-methyl-2-pyrrolidone (60 ml). The mixture was stirred at 50° C. for 0.5 h. Another oil phase was prepared from ISOPAR™ H, surfactant and stabilizer. For example, SPAN™ 85 (3.6 g) and HYPEMER™ 1599 (1.2 g) were added into ISOPAR™ H (120 mL), and allowed to form a clear solution by stirring for 5 minutes. Then the two oil phases were mixed and homogenized at 15000 rpm for 2 min. The as-formed emulsion was then transferred to a flask and stirred for 3 h. Then the emulsion was poured into ethanol (1 liter) for extraction. HDCNs powders were precipitated from ethanol and filtered out. The HDCNs powders were dried in vacuum oven at 50° C. overnight. Finally, the powders were compression molded at 200° C. to form the molded part.

All ranges disclosed herein are inclusive of the endpoints, and the endpoints are independently combinable with each other. "Or" means "and/or." As used herein, "combination" is inclusive of blends, mixtures, alloys, reaction products, and the like. "A combination thereof" means "a combination comprising one or more of the listed items and optionally a like item not listed." All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A method of manufacturing a hemiaminal dynamic covalent network, the method comprising:

reacting a diamine and formaldehyde in the presence of a reaction medium comprising a first solvent and an immiscible second solvent at a temperature of about 15° C. to about 100° C. to form the hemiaminal dynamic covalent network, wherein the reaction is conducted in an emulsion or a suspension.

2. The method of claim 1, wherein the first solvent is a polar solvent comprising one or more of the following: 1-methyl-2-pyrrolidone; N,N-dimethyl formamide; N,N-dimethyl acetamide; dimethyl sulfoxide; hexamethylphosphoramide; diphenyl sulfone; or tetramethylene sulfone.

3. The method of claim 1, wherein the immiscible second solvent is a nonpolar solvent comprising one or more of the following: benzene; toluene; xylenes; diethyl benzene; C5-C20 alkanes; or diethyl ether.

4. The method of claim 3, wherein the immiscible second solvent is a paraffinic hydrocarbon.

5. The method of claim 1, wherein the volume ratio of the first solvent relative to the immiscible second solvent is about 1:1 to about 1:5.

6. The method of claim 1, wherein the reaction medium further comprises water.

7. The method of claim 1, wherein the reaction medium further comprises one or more of a surfactant; or a stabilizer.

8. The method of claim 7, wherein the surfactant comprises sorbitan esters.

9. The method of claim 7, wherein the stabilizer comprises amphiphilic copolymers.

10. The method of claim 1, wherein the diamine is 4,4'-oxydianiline, 4,4'-diaminodiphenylmethane, 3,3'-methylenedianiline, or 4-aminophenyl sulfone.

11. The method of claim 1, further comprising obtaining a powder of the hemiaminal dynamic covalent network by spray drying.

12. The method of claim 1, further comprising contacting a reaction product comprising the hemiaminal dynamic covalent network, the first solvent, and the second solvent with a polar protic solvent to precipitate the hemiaminal dynamic covalent network; and filtering the precipitated hemiaminal dynamic covalent network.

13. The method of claim 11, further comprising drying the filtered hemiaminal.

14. A method of manufacturing a hemiaminal dynamic covalent network, the method comprising:

combining a polar phase with a nonpolar phase; the polar phase comprising a diamine, formaldehyde, and a polar solvent; and the nonpolar phase comprising a nonpolar solvent to form an emulsion or a suspension; and reacting the diamine with formaldehyde in the emulsion or suspension to form the hemiaminal dynamic covalent network.

15. The method of claim 13, wherein the polar phase further comprises water.

16. The method of claim 13, wherein the nonpolar phase further comprises one or more of a surfactant or a stabilizer.

17. The method of claim 13, wherein the volume ratio of the polar phase relative to the nonpolar phase is about 1:1 to about 1:5.

18. A method of manufacturing an article comprising a poly(hexahydrotriazine), the method comprising:

providing a composition comprising a hemiaminal dynamic covalent network manufactured according to the method of claim 1, and molding the composition to form an article comprising a poly(hexahydrotriazine).

19. A method of manufacturing an article comprising a poly(hexahydrotriazine), the method comprising:

providing a composition comprising a hemiaminal dynamic covalent network manufactured according to the method of claim 14, and molding the composition to form an article comprising a poly(hexahydrotriazine).

* * * * *